United States Patent
Jung et al.

(10) Patent No.: US 9,210,741 B2
(45) Date of Patent: Dec. 8, 2015

(54) HIGH FREQUENCY INDUCTION HEATING DOUBLE STEEL BELT PRESS APPARATUS

(75) Inventors: Gi-Hune Jung, Gyeonggi-do (KR); Hee-June Kim, Seongnam-si (KR)

(73) Assignee: LG HAUSYS, LTD., Seoul (KR)

( * ) Notice: Subject to any disclaimer, the term of this patent is extended or adjusted under 35 U.S.C. 154(b) by 319 days.

(21) Appl. No.: 13/578,943

(22) PCT Filed: Feb. 18, 2011

(86) PCT No.: PCT/KR2011/001101
§ 371 (c)(1),
(2), (4) Date: Aug. 14, 2012

(87) PCT Pub. No.: WO2011/102679
PCT Pub. Date: Aug. 25, 2011

(65) Prior Publication Data
US 2012/0318461 A1    Dec. 20, 2012

(30) Foreign Application Priority Data
Feb. 22, 2010    (KR) .................. 10-2010-0015554

(51) Int. Cl.
*H05B 6/10* (2006.01)
*B29C 70/50* (2006.01)
*B29K 101/12* (2006.01)
*B29C 43/48* (2006.01)

(52) U.S. Cl.
CPC .............. *H05B 6/107* (2013.01); *B29C 70/506* (2013.01); *B29C 2043/483* (2013.01); *B29K 2101/12* (2013.01)

(58) Field of Classification Search
CPC ......... H05B 6/10; B29C 70/50; B29C 70/508
USPC ................... 156/379.6, 380.3, 580, 583.1
See application file for complete search history.

(56) References Cited

U.S. PATENT DOCUMENTS

| | | | | |
|---|---|---|---|---|
| 4,219,524 A * | 8/1980 | Miller | ............................ | 264/216 |
| 4,597,818 A * | 7/1986 | Aoyama et al. | ............ | 156/308.2 |
| 5,075,057 A | 12/1991 | Hoedl | | |
| 5,716,479 A * | 2/1998 | Mikats et al. | .............. | 156/583.5 |
| 6,290,809 B1 | 9/2001 | Bielfeldt et al. | | |
| 7,406,288 B2 * | 7/2008 | Nakamoto et al. | ........... | 399/329 |
| 2007/0071523 A1 * | 3/2007 | Suzuki | ........................ | 399/329 |

FOREIGN PATENT DOCUMENTS

| | | |
|---|---|---|
| DE | 833252 | 3/1952 |
| GB | 708342 | 5/1954 |

(Continued)

OTHER PUBLICATIONS

Machine translation of JP 05-245866, date unknown.*

(Continued)

*Primary Examiner* — Jeff Aftergut
(74) *Attorney, Agent, or Firm* — Nath, Goldberg & Meyer; Joshua B. Goldberg; Tanya E. Harkins

(57) ABSTRACT

The present invention relates to an apparatus for manufacturing a thermoplastic/filament hybrid composite, and more particularly, to a high frequency induction heating double steel belt press apparatus which uses an induction heating unit and double steel belts to allow rapid heating through accurate and uniform temperature control.

4 Claims, 2 Drawing Sheets

(56) References Cited

FOREIGN PATENT DOCUMENTS

| | | |
|---|---|---|
| GB | 745628 | 2/1956 |
| JP | 61-242799 A | 10/1986 |
| JP | S63303697 A | 12/1988 |
| JP | 5-245866 A * | 9/1993 |
| JP | 05-245866 A * | 9/1993 |
| JP | 2004314358 A | 11/2004 |
| KR | 10-1999-0046611 A | 7/1999 |
| KR | 10-2000-0053694 A | 9/2000 |
| WO | 90/06841 | 6/1990 |
| WO | 95/20481 | 8/1995 |

OTHER PUBLICATIONS

Research Disclosure 290104,, "Consolidation press for fibre reinforced thermoplastics", Jun. 1988.*

European Application No. 11744921.5, European Search Report dated May 8, 2015, seven (7) pages.

* cited by examiner

HIGH FREQUENCY INDUCTION HEATING DOUBLE STEEL BELT PRESS APPARATUS

TECHNICAL FIELD

The present invention relates to an apparatus for manufacturing a thermoplastic/filament hybrid composite, and more particularly, to a high frequency induction heating double steel belt press apparatus, which employs an induction heating unit and a pair of steel belts to allow rapid heating through accurate and uniform temperature control.

BACKGROUND ART

Generally, filament-reinforced plastics include continuous fibers for reinforcement such as glass fibers or carbon fibers embedded in plastics, which typically have relatively low mechanical strength. Such filament-reinforced plastics exhibit superior properties in terms of mechanical strength, rigidity and impact strength to short fiber-reinforced thermoplastics having a length of 1 mm or less or to long fiber-reinforced plastics such as long fiber-reinforced thermoplastics (LFT) or glass mat-reinforced thermoplastics (GMT), which have a length of 5 to 50 mm.

Further, filament-reinforced plastics need to have flexibility so as to be woven in a single or two directions such that the woven filament-reinforced plastic structure may be applied to products requiring various mechanical properties.

The filament-reinforced plastics are typically produced through pultrusion or a process of commingling followed by hot pressing.

In pultrusion, widely dispersed bundles of filaments are passed through dies or a bath containing a liquid (or melt) resin so as to impregnate the plastic resin into the bundles of filaments. Although pultrusion can increase the degree of impregnation under optimal process conditions, it is difficult to regulate the amounts of the reinforcing fibers (that is, filaments) and the plastic resin, and to weave the filament-reinforced plastics due to low flexibility.

In the process of commingling followed by hot pressing, filaments and a fiber plastic resin are commingled and then subjected to hot pressing. Since the filaments do not lose inherent flexibility of fibers even after physical coupling between the filaments and the plastic resin through commingling and hot pressing, the commingled filaments can be easily woven, exhibit excellent formability and impregnability upon hot pressing after weaving, and allow easy adjustment of the amounts of the reinforcing filament and the plastic resin in the filament-reinforced plastics.

In the process of commingling followed by hot pressing, however, since the plastic resin is randomly mingled with the bundle of filaments, the plastic resin is partially insufficiently impregnated into the bundle of filaments upon hot pressing after weaving, thereby deteriorating uniformity of physical properties. In addition, when the plastic resin is prepared in the form of fibers, there is a drawback in that only thermoplastic materials having sufficient elongation in relation with processibility can be restrictively used.

Therefore, there is an urgent need for an apparatus for producing a thermoplastic/filament hybrid composite, which can be easily woven, exhibit excellent impregnation uniformity and impregnability upon melt impregnation after weaving, and allows application of various kinds of thermoplastics.

DISCLOSURE

Technical Problem

The present invention is directed to providing a high frequency induction heating double steel belt press apparatus for manufacturing a composite material through impregnation of glass fibers and a thermoplastic resin, which may reduce energy consumption during heating in a process of producing an impregnated thermoplastic hybrid composite tape through high frequency induction heating.

Technical Solution

One aspect of the present invention provides a high frequency induction heating double steel belt press apparatus for manufacturing a thermoplastic/filament hybrid composite by supplying thermoplastic tapes to both sides of a widely dispersed bundle of glass fibers, followed by heating, compression, and cooling of the bundle of glass fibers, which includes a pair of permeable steel belts disposed above and under the glass fibers and the continuously supplied thermoplastic tapes, and rotated in opposite directions to transfer the glass fibers and the thermoplastic tapes while compressing the glass fibers and the thermoplastic tapes from above and down; inlet and outlet sprockets respectively provided to an inlet and an outlet of the pair of permeable steel belts to transfer the permeable steel belts; an induction coil unit divided into upper and lower plates to surround the permeable steel belts; and a cooling unit placed downstream of the induction coil unit and cooling a thermoplastics/filaments hybrid composite unit prepared through hot melting and impregnation in the induction coil unit while compressing upper and lower sides of the thermoplastic/filament hybrid composite. Here, the induction coil unit may be configured to allow the upper and lower plates to be opened or closed.

The permeable steel belts may be made of at least one material selected from among aluminum, copper, stainless steel, and carbon steel.

The induction coil unit may include joining points formed at opposite sides of each of the upper and lower plates such that the joining points can be connected to or disconnected from each other according to lifting or lowering operation of the permeable steel belts.

The inlet sprocket or the outlet sprocket may be movable in a horizontal direction to adjust tension of the permeable steel belts.

The glass fiber may be transferred at a speed of 2 to 40 m per minute, and electric current may be applied at a high frequency ranging from 20 to 40 Khz to the induction coil unit.

The cooling unit may include a fan or a press roller through which cooling water flows, and the press roller may be movable in a vertical direction.

Advantageous Effects

In the apparatus according to the present invention, high frequency induction heating is used to heat impregnated thermoplastic tapes and glass fibers, thereby enabling rapid heating through accurate and uniform temperature control while reducing power for heating the impregnated thermoplastic tapes and the glass fibers to 10% that of the state of the art.

In addition, the apparatus according to the present invention employs an openable high frequency induction heating coil unit, thereby facilitating replacement of the belts as needed and providing excellent workability in loading an initial sample on a belt press.

BEST MODE

Figure 1:
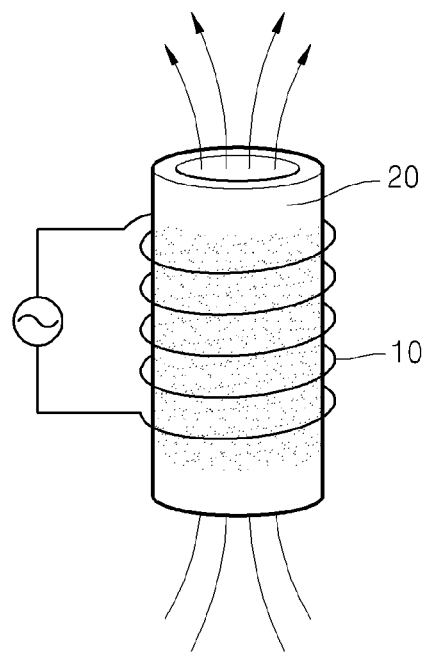
FIG. 1 is a diagram of a general high frequency induction heating system.

Embodiments of the present invention will now be described in more detail with reference to the accompanying drawings.

The above and other aspects, features, and advantages of the invention will become apparent from the detailed description of the following embodiments in conjunction with the accompanying drawings. It should be understood that the present invention is not limited to the following embodiments and may be embodied in different ways, and that the embodiments are given to provide complete disclosure of the invention and to provide a thorough understanding of the invention to those skilled in the art. The scope of the invention is defined only by the claims. Like components will be denoted by like reference numerals throughout the specification.

In the drawings, the sizes and relative sizes of elements may be exaggerated for clarity. Further, it will be understood that when a certain element is referred to as being "present inside" or "connected to" another element, the certain element can adjoin the other element or can be separated from the other element. When the element is separated from the other element, it should be understood that an intervening element can also be present to secure or connect the certain element to the other elements even without a description thereof in the specification.

FIG. 1 is a diagram of a general high frequency induction heating system.

For high frequency induction heating, a heating coil 10 is generally prepared using a copper tube, through which cooling water can flow, and is spirally wound around an electrically conductive heating object 20. When high frequency electric current is applied to the heating coil 10 made of the copper tube, heat is generated by electric current induced in the electrically conductive heating object 20. The heating object 20 may be made of aluminum, copper, stainless steel, or carbon steel. Advantageously, any magnetically permeable material may be used for the heating object.

High frequency induction heating is based on principles of Joule heating and energy loss by magnetic hysteresis. Considering the surface effect by which the penetration depth decreases with increasing frequency, it is necessary to select suitable frequencies according to applications.

Figure 2:
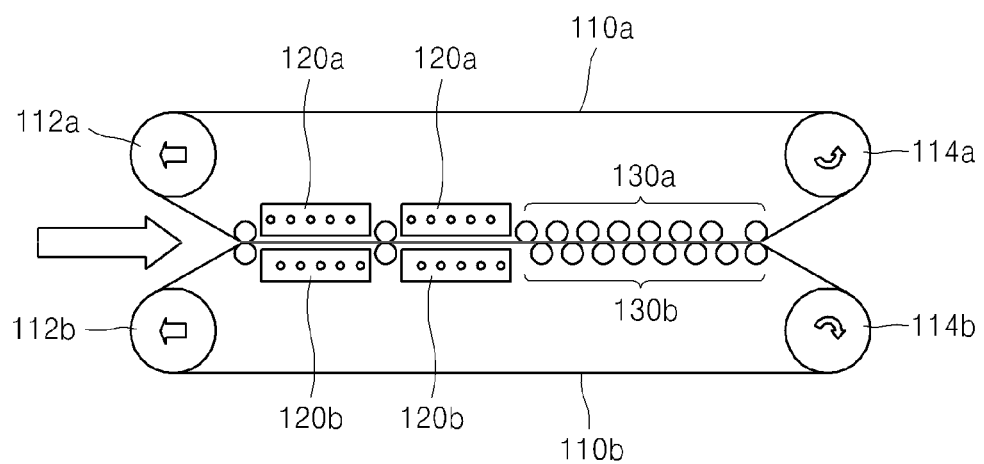
FIG. 2 and FIG. 3 are diagrams of a high frequency induction heating double steel belt press apparatus according to one embodiment of the present invention.
Figure 3:
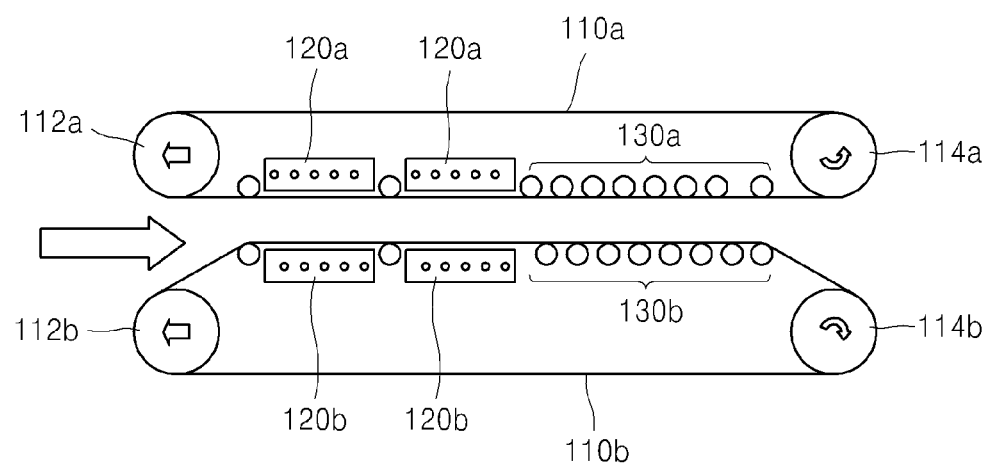

FIG. 2 and FIG. 3 are diagrams of a high frequency induction heating double steel belt press apparatus according to one embodiment of the present invention, in which FIG. 2 shows an induction coil unit in a closed state and FIG. 3 shows the induction coil unit in an open state.

Referring to FIG. 2, the high frequency induction heating double steel belt press apparatus 100 according to this embodiment includes a pair of permeable steel belts 110a, 110b rotated in opposite directions, inlet sprockets 112a, 112b and outlet sprockets 114a, 114b placed at opposite sides of the permeable steel belts 110a, 110b to rotate the permeable steel belts 110a, 110b, induction coil units 120a, 120b configured to surround the entirety of the pair of permeable steel belts 110a, 110b in a zone where the permeable steel belts 110a, 110b overlap each other, and cooling units 130a, 130b placed downstream of the induction coil units 120a, 120b and cooling both sides of a material subjected to heating in the induction coil units 120a, 120b while compressing both sides of the material.

The present invention is an apparatus for impregnating the thermoplastic tapes into both sides of the glass fibers provided in a band shape. For impregnation of the thermoplastic tapes into the glass fibers, heating, compression, and cooling are performed.

In particular, according to the present invention, heating is performed through high frequency induction heating in order to reduce energy consumption.

Next, the respective components of the high frequency induction heating double steel belt press apparatus according to the embodiment will be described in detail.

The apparatus includes the pair of permeable steel belts 110a, 110b. Each of the permeable steel belts 110a, 110b may be embodied by a caterpillar belt.

The pair of permeable steel belts is composed of an upper permeable steel belt 110a and a lower permeable steel belt 110b, which are rotated in opposite directions. The upper permeable steel belt 110a is rotated in the counterclockwise direction, and the lower permeable steel belt 110b is rotated in the counterclockwise direction. The glass fibers and the thermoplastic tapes are supplied from the left side in the drawings and are then passed through a gap between the upper and lower permeable steel belts 110a, 110b, subjected to heating, compression and cooling, thereby forming a hybrid composite.

The permeable steel belts 110a, 110b are made of a material having magnetic permeability, for example, aluminum (Al), copper (Cu), stainless steel and carbon steel, without being limited thereto. It should be understood that any magnetically permeable material may be used for the permeable steel belt.

Each of the permeable steel belts 110a, 110b is provided at opposite sides thereof with rollers, and the upper permeable steel belt 110a may be moved up or down. This configuration provides repair convenience together with loading convenience upon initially loading the glass fiber and the thermoplastic tapes.

Height adjustment of the upper permeable steel belt 110a may be achieved through adjustment of a distance between the inlet sprocket 112a and the outlet sprocket 114a disposed at both sides thereof. When the distance between the inlet sprocket 112a and the outlet sprocket 114a is increased, the upper permeable steel belt 110a is lifted, as shown in FIG. 3.

Although only the distance between the inlet sprocket 112a and the outlet sprocket 114a is illustrated as being adjustable in FIG. 3, the distance between the inlet sprocket 112b and the outlet sprocket 114b may also be adjusted.

Adjustment of the distance between the inlet sprockets 112a, 112b and the outlet sprockets 114a, 114b serves to regulate tension of the belts. The lengths or tensions of the permeable steel belts 110a, 110b can be varied due to thermal expansion or other reasons. To compensate for such variation in length or tension, the distances between the inlet sprockets 112a, 112b and the outlet sprockets 114a, 114b may be corrected.

Among the inlet sprockets 112a, 112b and the outlet sprockets 114a, 114b, the outlet sprockets 114a, 114b are driving sprockets and the inlet sprockets 112a, 112b are driven sprockets. Thus, the outlet sprockets 114a, 114b are operated to pull the permeable steel belts 110a, 110b.

The induction coil units 120a, 120b are configured to surround the entire periphery of the permeable steel belts 110a, 110b to heat the permeable steel belts 110a, 110b via magnetic hysteresis. Here, electric current may be applied at a high frequency of 20 to 40 Khz to the induction coil units 120a, 120b. Further, the steel belts 110a, 110b may be conveyed at a speed of 2 to 40 m per minute.

If the frequency is lower than this range, heating is not sufficiently performed, thereby making it difficult to obtain sufficient bonding. If the frequency is higher than this range, there is a possibility of flexibility loss due to excessive impregnation.

Further, if the conveying speed of the permeable steel belts 110a, 110b is above this range, sufficient heat exchange cannot be obtained, whereas if the conveying speed is below this range, there is a problem of productivity reduction.

Each of the induction coil units may be divided into an upper induction coil plate 120a placed above the upper permeable steel belt 110a and a lower induction coil plate 120b placed under the lower permeable steel belt 110b. Each of the upper and lower induction coil plates 120a, 120b is provided at opposite sides thereof with joining points.

As shown in FIG. 2, when the upper induction coil plate 120a approaches the lower induction coil plate 120b, the joining points thereof are joined to each other, so that the upper and lower induction coil plates 120a, 120b are joined to each other to constitute a single coil, and when the coil units are separated from each other as shown in FIG. 3, the joining points are separated from each other.

When the upper induction coil plate 120a is joined to the lower induction coil plate 120b via the joining points, the joined induction coil plates 120a, 120b surround the pair of permeable steel belts 110a, 110b, so that the permeable steel belts 110a, 110b are heated by high frequency electric current flowing through the upper and lower induction coil plates 120a, 120b.

With the configuration wherein the induction coil plates 120a, 120b may be joined to each other via the joining points to be separated from each other in the vertical direction as needed, it is possible to provide convenience in loading materials at an initial time and to guarantee repair convenience.

The cooling units 130a, 130b serve to cool the glass fibers and the thermoplastic tapes impregnated thereto downstream of the induction coil units 120a, 120b while hardening the glass fibers and the thermoplastic tapes through compression.

Thus, the cooling units 130a, 130a are placed to apply force to compress upper and lower sides of the pair of permeable steel belts 110a, 110b while cooling the pair of permeable steel belts 110a, 110b. Such cooling units 130a, 130a may be embodied by press rollers through which cooling water flows. As the press rollers are maintained at low temperature by supplying the cooling water into the press rollers, it is possible to apply force to the permeable steel belts 110a, 110b, which contact the press rollers, while cooling the permeable steel belts 110a, 110b.

Further, as in the induction coil units, the cooling units 130a, 130a are also configured to be lifted or lowered such that the distance between the pair of permeable steel belts 110a, 110b can be adjusted, as shown in FIG. 3. Specifically, when the cooling units 130a, 130b are embodied by the press rollers through which cooling water flows, the press rollers are movable in the vertical direction.

According to the embodiment of the invention, the apparatus employs high frequency induction heating in order to compensate for problems of conventional heating, such as eccentricity of steel belts caused by contact with multiple rollers in use of heating rollers, and heat loss in use of a radiation heat chamber, thereby enabling rapid heating through accurate and uniform temperature control while reducing power for heating the impregnated thermoplastic tapes and the glass fibers to 10% that of the state of the art without compromising heating performance.

Although some exemplary embodiments have been described with reference to the accompanying drawings, the present invention may be embodied in many different ways and should not be construed as being limited to the embodiments set forth herein. It will be understood by those skilled in the art that various modifications, changes, alterations, and equivalent embodiments can be made without departing from the spirit and scope of the invention. Therefore, it should be appreciated that the foregoing embodiments are provided for illustrative purposes only and are not to be in any way construed as limiting the present invention.

The invention claimed is:

1. A high frequency induction heating double steel belt press apparatus for manufacturing a thermoplastic/filament hybrid composite by supplying thermoplastic tapes to both sides of a widely dispersed bundle of glass fibers, followed by heating, compression, and cooling the bundle of glass fibers, comprising:

a pair of permeable steel belts disposed above and under the glass fibers and the continuously supplied thermoplastic tapes, and rotated in opposite directions to transfer the glass fibers and the thermoplastic tapes while compressing the glass fibers and the thermoplastic tapes from above and down;

inlet and outlet sprockets respectively provided to an inlet and an outlet of the pair of permeable steel belts to transfer the permeable steel belts, said inlet sprocket or outlet sprocket being movable in a horizontal direction to adjust tension of the permeable steel belts;

first and second induction coil units, each of the first and second induction coil units divided into upper and lower plates to surround the permeable steel belts, each induction coil unit being configured to allow the upper and lower plates to be open or closed and each induction coil unit being configured to receive high frequency electric current ranging from 20 to 40 khz to allow the upper and lower plates and the permeable steel belts to be heated; and a cooling unit comprising alternating upper and lower press rollers through which cooling water flows and which are movable in a vertical direction placed downstream from each of the induction coil units and cooling a thermoplastics/filaments hybrid composite prepared through hot melting and impregnation in each induction coil unit while compressing upper and lower sides of the thermoplastic/filament hybrid composite.

2. The apparatus of claim 1, wherein the induction coil unit comprises joining points formed at opposite sides of each of the upper and lower plates such that the joining points can be connected to or disconnected from each other according to lifting or lowering operation of the permeable steel belts.

3. The apparatus of claim 1, wherein the glass fibers are transferred at a speed of 2 to 40 m per minute.

4. The apparatus of claim 1, wherein the permeable steel belts are made of at least one material selected from among aluminum, copper, stainless steel, and carbon steel.

* * * * *